R. W. BARTON.
VARIABLE SPEED DRIVING MECHANISM.
APPLICATION FILED JAN. 17, 1916.

1,190,704.

Patented July 11, 1916.
2 SHEETS—SHEET 2.

Inventor
R. W. Barton
By C. N. Butler
Attorney

UNITED STATES PATENT OFFICE.

RENSSELAER W. BARTON, OF PHILADELPHIA, PENNSYLVANIA.

VARIABLE-SPEED DRIVING MECHANISM.

1,190,704.    Specification of Letters Patent.    Patented July 11, 1916.

Application filed January 17, 1916. Serial No. 72,462.

*To all whom it may concern:*

Be it known that I, RENSSELAER W. BARTON, a citizen of the United States, residing in the city of Philadelphia, county of Philadelphia, and State of Pennsylvania, have invented certain Improvements in Variable-Speed Driving Mechanisms, of which the following is a specification.

My invention is a driving mechanism adapted for producing a constant speed at any desired rate within given limits, and my leading object is to provide a simple means for varying the speed of a mechanism adapted for giving uniform motion at any desired rate through the application of power without shock.

In its preferred form, my invention is comprised in the combination of a friction pulley with a plurality of friction pawls arranged in such relation that at least one is in driving engagement with the pulley at all times, the several pawls engaging the pulley in succession, and adjustable mechanism comprising swinging arms to which differential oscillatory movements are communicated and by which the pawls are caused to engage the pulley in a variable manner depending on the adjustment of the mechanism.

The nature and advantages of my improvements will be fully understood from the following description and the accompanying drawings in illustration thereof.

Figure 1:
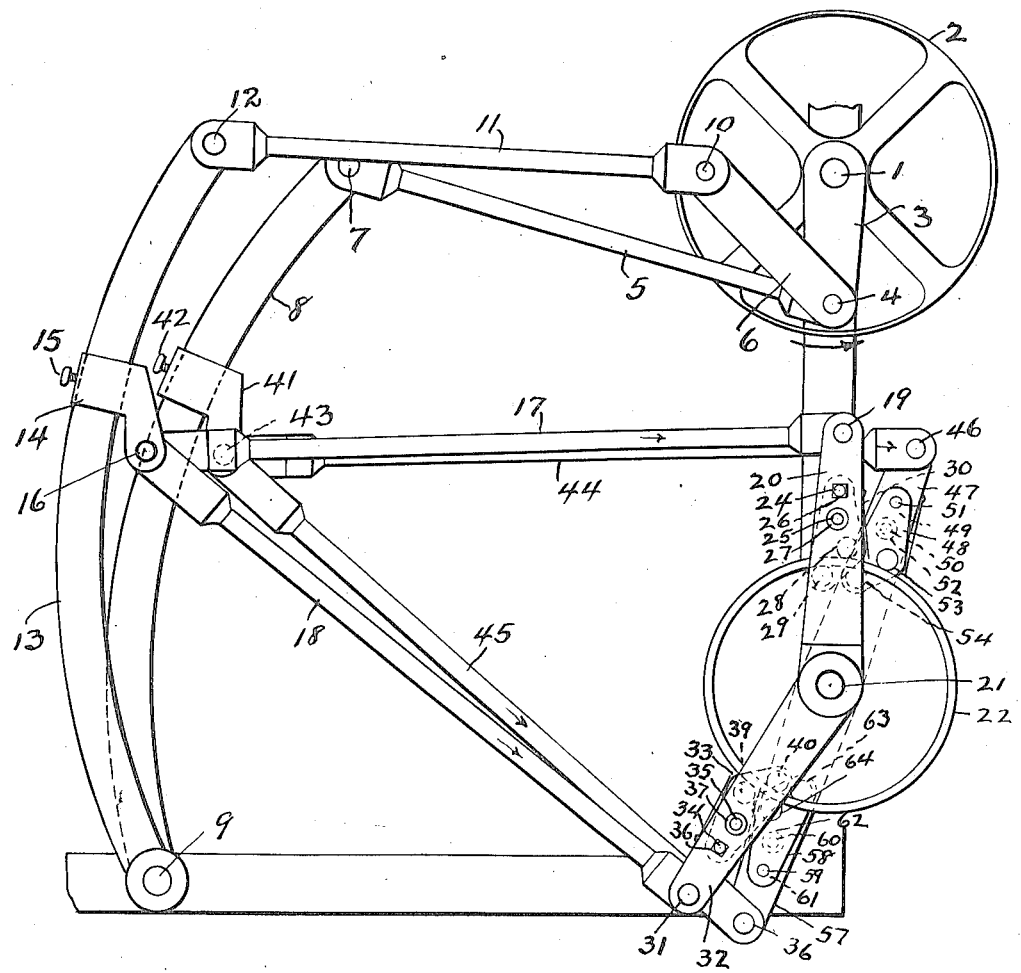
Figure 2:
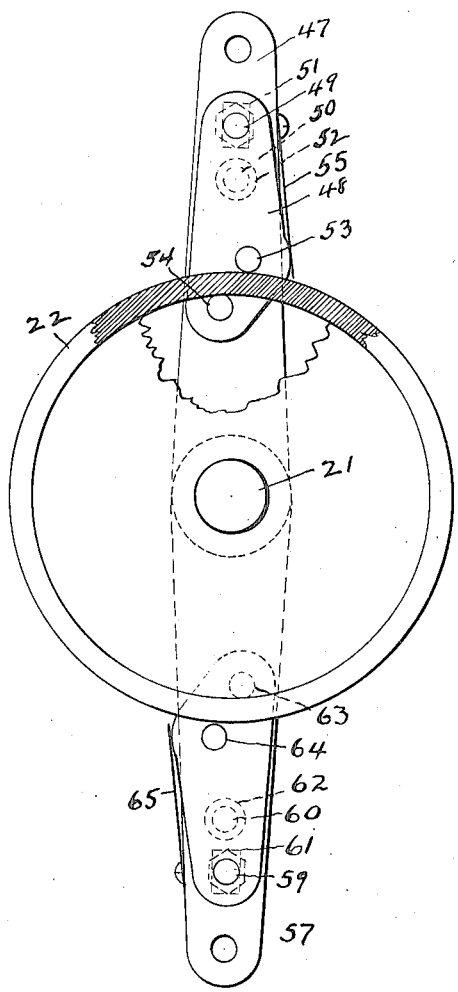
Figure 3:
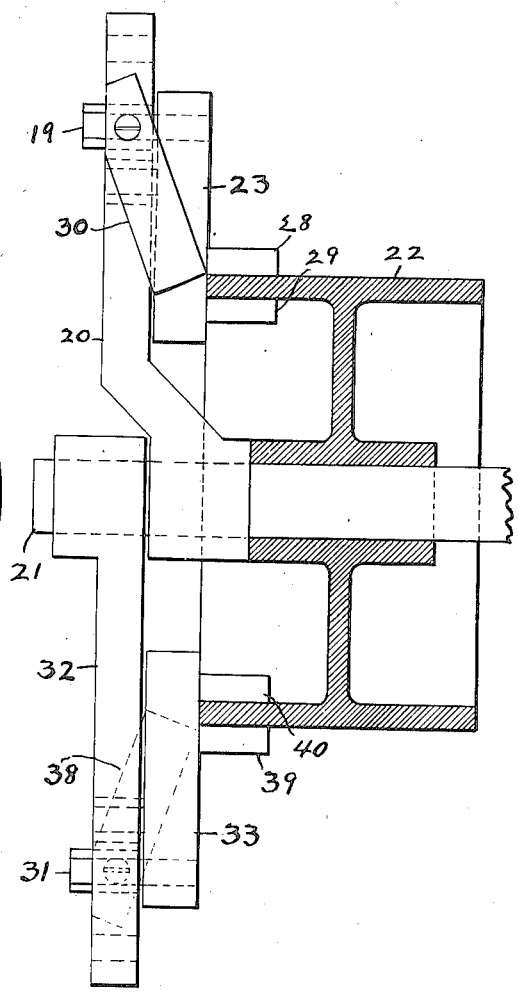

In the drawings, Figure 1 is a side elevation of mechanism embodying my invention; Fig. 2 is a part sectional elevation of the driven pulley combined with a pair of the levers and pawls for actuating it; and Fig. 3 is a part sectional elevation at right angles to the view shown in Fig. 1 in illustration of the relation between the driven pulley and a second pair of levers having pawls coacting therewith.

The mechanism, as illustrated in the drawings, comprises a journaled shaft 1 which is driven by a belt wheel 2 fixed thereon and driving a crank arm 3 fixed thereto. A crank pin 4 connects the arms 3 with the links 5 and 6. The link 5 is connected by a pivot 7 with the upper end of a curved arm 8 which is fulcrumed on the bearing 9, and the link 6 is connected by a pivot 10 with a link 11 which is connected by a pivot 12 with a curved arm 13 fulcrumed on the bearing 9.

A bracket 14 is adjustable along the arm 13, being fixed in the desired position by the set screw 15, and a pivot 16 connects the bracket with the links 17 and 18. The link 17 is connected by a pivot 19 with a lever 20 which is journaled on a shaft 21 having the pulley 22 fixed thereon. The lever 20 is provided with a pawl 23 which is loosely connected therewith by means of the studs 24 and 25 fixed to the pawl and movable in the respective bearings 26 and 27 in the lever. Studs 28 and 29 are fixed on the pawl 23 and disposed respectively without and within an end of the pulley's periphery. A spring 30 is fixed to the lever 20 and acts against the pawl 23 to press it to the desired position. The link 18 is connected by a pivot 31 with a lever 32 fulcrumed on the shaft 21, this lever carrying a pawl 33 through the studs 34 and 35 thereof which loosely engage the bearings 36 and 37 of the lever, the latter being provided with a spring 38 which acts against the pawl 33 and the pawl being provided with the studs 39 and 40 disposed exteriorly and interiorly, respectively, of the end of the periphery of the pulley 22 engaged by the studs 28 and 29.

A bracket 41 is adjustable along the arm 8, being set in position by a screw 42, and is connected by a pivot 43 with the links 44 and 45. The link 44 is connected by a pivot 46 with a lever 47 which is journaled on the shaft 21; and a pawl 48, having the studs 49 and 50 thereon, is connected with the lever, having the bearings 51 and 52 in which the studs are loosely engaged. Studs 53 and 54 on the pawl 48 are disposed without and within the end of the periphery of the pulley 22 opposite the studs 28 and 29, and a spring 55 on the lever 47 acts against the pawl to press it to the desired position. The link 45 is connected by a pivot 56 with a lever 57 which is journaled on the shaft 21; and a pawl 58, having the studs 59 and 60 fixed thereto, is loosely mounted on the lever by the engagement of such studs in the lever's bearings 61 and 62. Studs 63 and 64 are carried by the pawl 58 and disposed respectively within and without an end of the periphery of the pulley 22 opposite the studs 39 and 40, and a spring 65 on the lever presses the pawl toward the desired position.

In operation, the revolution of the wheel 2, the arm 3, and the pin 4, in the direction of the contiguous arrow, causes the link 5 to act upon the arc 8 so that the links 44 and 45 are simultaneously moved in the directions of the arrows thereon. This movement of the link 44 rocks the lever 47 in its forward movement on the shaft 21 and the lever acts through the pawl 48 upon the pulley 22, the studs 53 and 54 gripping the periphery of the pulley which is carried forward thereby. The contemporaneous movement of the link 45 rocks the lever 57 on the shaft 21 and moves the pawl 58 therewith, the studs 63 and 64 moving freely with relation to the pulley 22 in this reverse movement of the pawl. It will be understood that the continued movement of the wheel 2 will reverse the action of the parts operating the pawls 48 and 58, when the studs 53 and 54 move back freely with relation to the pulley 22 and the studs 63 and 64 grip the pulley to carry it forward during the idle or reverse movement of the pawls 48. As the wheel 2, crank 3 and pin 4 move in the direction of the adjacent arrow, from the position shown in Fig. 1, the link 6 acts through the parts 10, 11, 12, 13, 14, and 16 on the links 17 and 18 to move them in the direction of the arrows thereon, differentially with relation to the movements of the corresponding parts 44 and 45. This movement of the link 17 rocks the lever 20 on the shaft 21 and the lever acts through the pawl 23 upon the studs 28 and 29 which are thereby caused to grip the periphery of the pulley 22. At the same time, the link 18 rocks the lever 32 on the shaft 21, carrying therewith the pawl 33 whose studs 39 and 40 move freely with relation to the pulley 22. It will be understood that the continued movement of the wheel 2 will effect the reverse movements of the intermediate parts for operating the pawls 23 and 33, when the studs 28 and 29 will move freely with relation to the pulley 22 and the studs 39 and 40 will grip the pulley to carry it forward. The loose connections of the pawls with the respective levers prevent the sticking and facilitate the disengagement of the pawls from the pulley in the reverse movement of said pawls. It will be understood that the respective connections between the crank 3 and the arcs 8 and 13 effect differential actions whereby the engaging friction pawls act in succession and several pawls are engaged at the same time so that certainty of action results. The adjustment by shifting the members 14 and 41 on the respective levers 13 and 8 regulates the lengths of the lever arms which effect the reciprocation of the links 17, 18, 44 and 45, and the arcs of oscillation of the respective levers 20, 32, 47, and 57 and the rate of movement of the pulley 22 by the respective pawls 23, 33, 48 and 58 of the levers. It will be understood that while the link 5 is journaled on the pin 4, the link 6 is fixed thereto so that, in the differential movement, as the pin 4 moves toward the dead center, the pin 10 is removed therefrom by a quadrant and the power will be transmitted primarily through the links 6 and 11, whereby the speed of the pulley 22 is augmented over that which it would have if driven through the link 5. That is to say, the crank pins 4 and 10 are so disposed and connected that when one is moving in the region of a dead center so that the movement transmitted thereby is quite limited, the other is in a region midway between its dead centers so that the movement transmitted thereby is quite extended, and the resultant of the differential actions is to apply force to the driven mechanism in the desired manner.

Having described my invention, I claim:

1. The combination of rotary driving means comprising devices pivoted at points revoluble about a center and approximately a quadrant apart, means comprising a pair of levers connected with said pivotal points and differentially operated by said driving means, a pair of links operated by and having a pivotal connection with each of said levers, a pair of levers provided with clutching means simultaneously oscillated in opposite directions by each of said pair of links, and a wheel revolved by the engagement therewith of said clutching means.

2. The combination of a revoluble wheel provided with a crank, a pair of curved levers, a link connecting said crank with one of said levers, a pair of links connecting said crank with the other of said levers, bearings adjustably connected to the respective levers, a pair of diverging links pivotally connected to each of said bearings, a pair of oppositely extending levers, the respective pairs of diverging links being connected with corresponding pairs of oppositely extending levers, friction pawls carried by the respective levers last named, and a friction wheel operated by said pawls.

3. The combination of a revoluble crank, a pair of levers, a link having a journaled connection with said crank and one of said levers, a second link fixed to said crank, a third link having a journaled connection with the other of said levers and said link fixed to said crank, whereby said crank communicates differential movements to said levers, a revoluble device, and means whereby said levers revolve said device.

In testimony whereof I have hereunto set my name this 15th day of January, 1916.

R. W. BARTON.